United States Patent
Chen

[11] Patent Number: 6,065,844
[45] Date of Patent: May 23, 2000

[54] DISPLAY REROUTING APPARATUS FOR COMMUNICATION EQUIPMENT

[75] Inventor: Neng-Shin Chen, Naperville, Ill.

[73] Assignee: Lucent Technologies Inc., Murray Hill, N.J.

[21] Appl. No.: 08/940,411

[22] Filed: Sep. 30, 1997

[51] Int. Cl.[7] .............................. G02B 5/08; G02B 27/14
[52] U.S. Cl. ...................... 359/857; 359/839; 359/834; 359/732; 359/633
[58] Field of Search .................................. 359/629, 630, 359/633, 637, 638, 726, 732, 833, 834, 856, 857, 872, 634, 839; 362/23, 24

[56] References Cited

U.S. PATENT DOCUMENTS

| | | | |
|---|---|---|---|
| 3,684,384 | 8/1972 | Hojo et al. | 359/630 |
| 3,772,507 | 11/1973 | Hills | 359/638 |
| 4,112,462 | 9/1978 | Mecklenborg | 358/104 |
| 4,790,504 | 12/1988 | Wills et al. | 248/183 |
| 5,187,743 | 2/1993 | Gumb et al. | 379/436 |
| 5,305,124 | 4/1994 | Chern et al. | 359/633 |
| 5,519,535 | 5/1996 | Mok | 359/629 |
| 5,530,586 | 6/1996 | Yasugaki | 359/630 |
| 5,539,578 | 7/1996 | Togino et al. | 359/630 |
| 5,629,806 | 5/1997 | Fergason | 359/633 |
| 5,661,604 | 8/1997 | Kuba | 359/633 |

*Primary Examiner*—Ricky D. Shafer
*Attorney, Agent, or Firm*—S. R. Williamson; J. J. Brosemer

[57] ABSTRACT

A display rerouting apparatus reroutes a displayed image from an image source in a display module for providing a redirected angular visibility for the displayed image. In an illustrative embodiment, the display rerouting apparatus includes a base panel having a rectangular opening or widow for positioning atop of a display module in communication equipment, a rear panel having a one-way reflective mirror positioned in a rectangular opening in this rear panel, and a front panel having a two-way reflective mirror positioned in a rectangular opening in this front panel. Both the rear and front panels are respectively hingeably attached at their lower edges to the rear and front edges of the base panel for facilitating the use of the rerouting apparatus on different types of communication. In operation, the image from the display module is projected through the base of the apparatus onto the two-way reflective mirror. This image is then reflected off of the two-way reflective mirror and on to the one way reflective mirror. From the one-way reflective mirror, the image is reflected to and projected through the two-way reflective mirror for viewing by an observer who looks through the two-way reflective mirror to see the image on the surface of the one-way reflective mirror. In an alternative embodiment of the display rerouting apparatus, a prism having a two-way reflective coating on one side and a one-way reflective coating on another, is advantageously employed.

6 Claims, 6 Drawing Sheets

DISPLAY REROUTING APPARATUS FOR COMMUNICATION EQUIPMENT

FIELD OF THE INVENTION

This invention relates generally to communication equipment and, more particularly, to communication equipment having a display module.

BACKGROUND OF THE INVENTION

Many types of communication equipment are now equipped with display modules that include either light emitting diodes (LEDs) or liquid crystal displays (LCDs) for providing visual information to a user. Such display modules are now found routinely in telephone devices where they provide a variety of information, such as Caller-ID, date and time of day for received telephone calls.

Often the information contained in the display module is difficult for a user to read. One example of such difficulty is attributed to the user's viewing angle relative to the surface of the display module. These display modules tend to be substantially flat and extend in a single planar direction. As the user's view of the displayed image becomes more oblique, accurately reading the information in the display module becomes more difficult. Another example is when the display module is located in moderate to strong ambient light which reflects off of the display surface of the module. Such reflections distorts the displayed image causing a user to have difficulty clearly focusing on this image.

To achieve the greatest visibility and clearest focus, a user typically must be positioned to view the display module at an angle normal to the display surface of the module. In that many telephone devices are now configurable either as wall-mountable or table-top instruments, the information displayed in a display module in one of these telephone devices is not easily viewable in both positions because of the fixed viewing angles. While many prior telephone devices that are configurable either as wall-mountable or table top instruments have built-in display modules which can be adjusted to a desired angular position, these devices are all complex and relatively expensive to implement. Albeit telephone devices with adjustable display modules do exist, it is desirable to be able to easily and inexpensively reroute display information available at any telephone device to a different, more effective viewing angle.

SUMMARY OF THE INVENTION

In accordance with the invention, display rerouting apparatus reroutes a displayed image from an image source in a display module for providing a redirected angular visibility for the displayed image. In a first illustrative embodiment, the display rerouting apparatus includes a base panel having a rectangular opening or widow for positioning atop of a display module in communication equipment, a rear panel having a one-way reflective mirror positioned in a rectangular opening in this rear panel, and a front panel having a two-way reflective mirror positioned in a rectangular opening in this front panel. Both the rear and front panels are respectively hingeably attached at their lower edges to the rear and front edges of the base panel for facilitating the use of the rerouting apparatus on different types of communication equipment. Also in the first illustrative embodiment, the display rerouting apparatus includes an elongated shroud which sits atop of an apex formed by the convergence of the rear panel and the front panel. In operation, the image from the display module is projected through the base panel of the apparatus onto the two-way reflective mirror. This image is then reflected off of the two-way reflective mirror and on to the one way reflective mirror. From the one-way reflective mirror, the image is reflected to and projected through the two-way reflective mirror for viewing by an observer who looks through the two-way reflective mirror to see the image as it appears on the surface of the one-way reflective mirror. In a second illustrative embodiment of the display rerouting apparatus, a prism having a two-way reflective coating on a first side and a one-way reflective coating on a second side is advantageously employed.

BRIEF DESCRIPTION OF THE DRAWING

The invention and its mode of operation will be better understood from the following detailed description when read with the accompanying drawings, in which.

Throughout the drawings, the same element when shown in more than one FIG. is designated by the same reference numeral.

DETAILED DESCRIPTION

Figure 1:
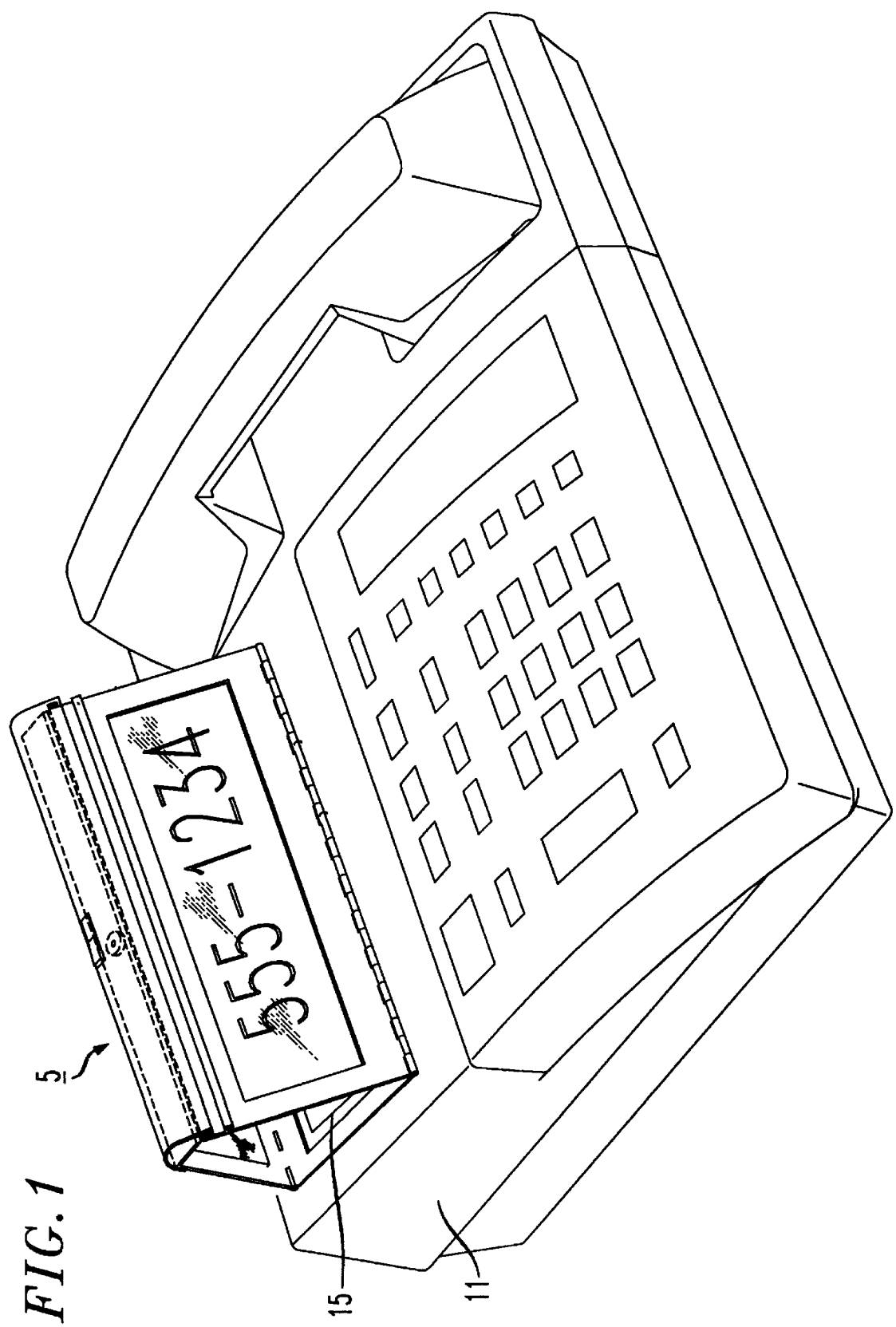
FIG. 1 illustrates a front and right side perspective view of the a first embodiment of a display rerouting apparatus on a telephone device with a tilted display module, in accordance with the present invention.

Referring now to FIG. 1, there is shown a first embodiment of a display rerouting apparatus 5, which easily affixes to communication equipment such as a telephone device 11 with a display module 15. This display rerouting apparatus 5 is usable with communication equipment 11 having display modules 15 whose display generally extends in a horizontal plane as well as other planar angles. As illustrated in FIG. 1, the display rerouting apparatus 5 is shown positioned on the telephone device 11 in a configuration for accommodating the tilted display module employed in this telephone device.

Figure 2:
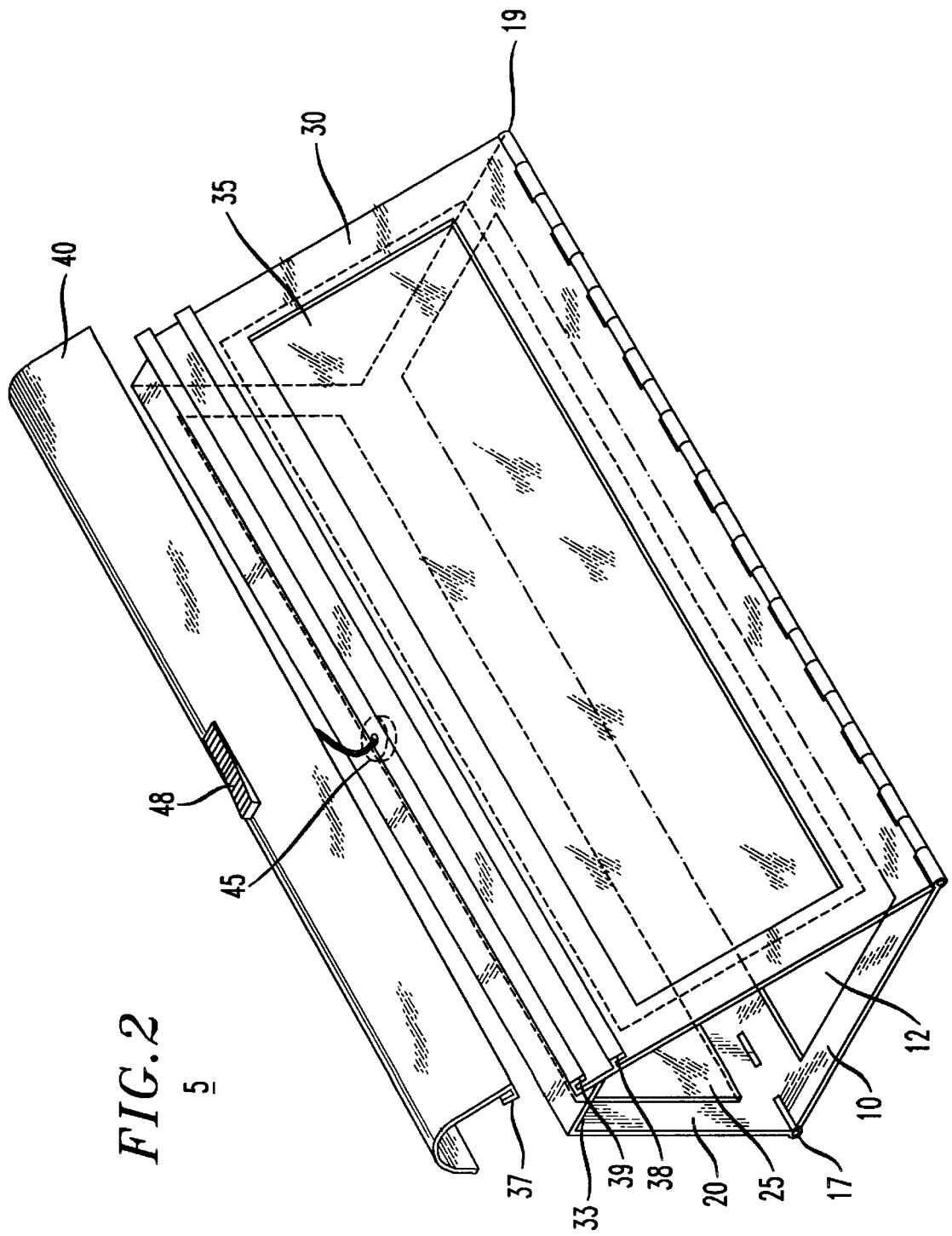
FIG. 2 is an illustration of a front and right side perspective view of the first embodiment of the display rerouting apparatus with a top shroud shown displaced from the apparatus in accordance with the present invention.
Figure 3:
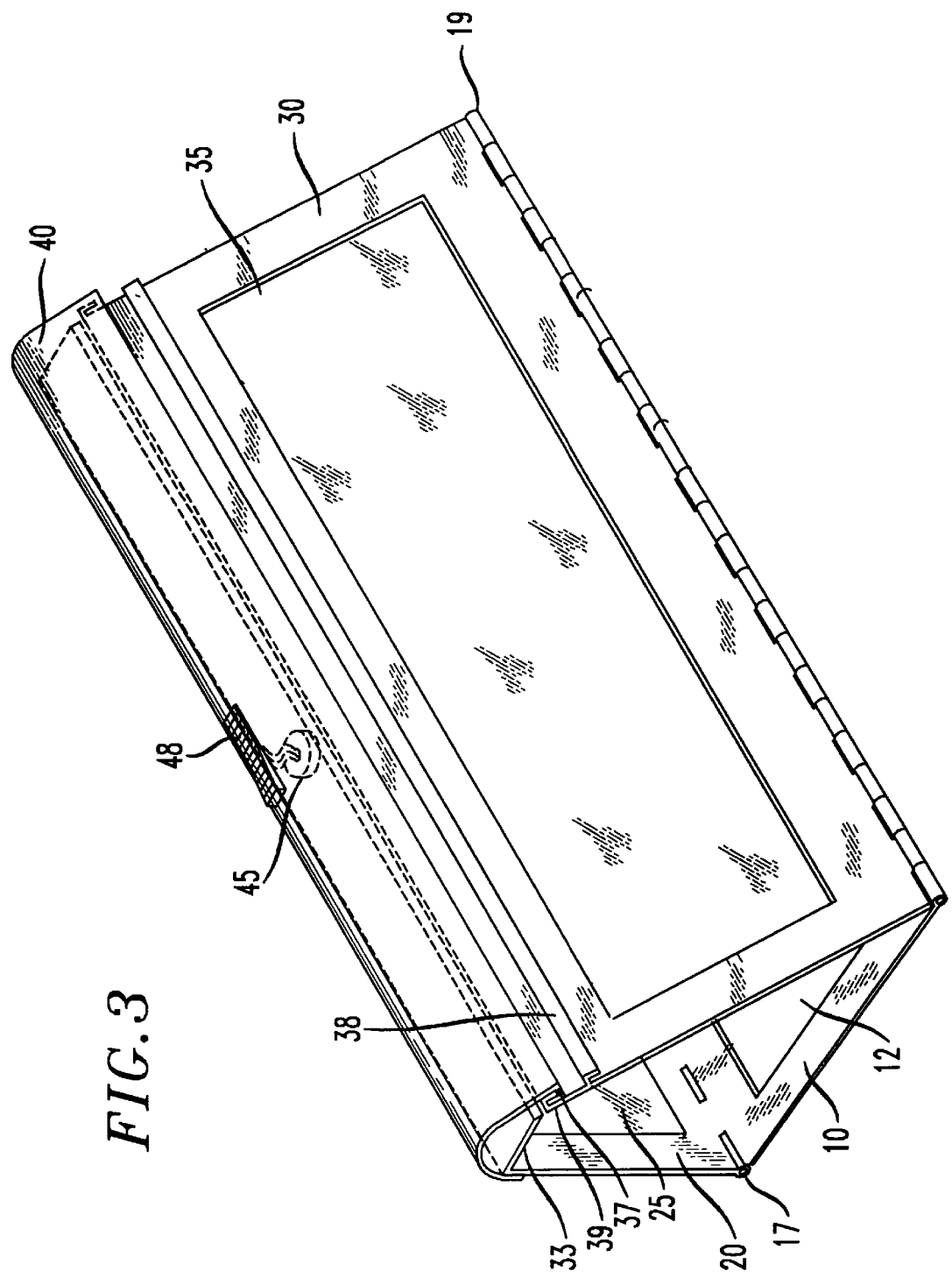
FIG. 3 is an illustration of a front and right side perspective view of the first embodiment of the display rerouting apparatus with the top shroud shown affixed atop the display in accordance with the present invention.

As more clearly illustrated in FIG. 2, the display rerouting apparatus 5 includes a base panel 10 having a rectangular opening or window 12 for positioning atop of a display module in communication equipment, a rear panel 20 having a one-way reflective mirror 25 positioned in a rectangular opening in this rear panel, and a front panel 30 having a two-way reflective mirror 35 positioned in a rectangular opening in this front panel. The rear panel 20 is attached at its lower edge to the rear edge of the base panel by a hinge 17 and is shown in this figure extending generally perpendicular or 90 degrees from this hinged edge, although another angular position is available, as described later herein. The front panel 30 is attached at its lower edge to a front edge of the base panel by a hinge 19 and is shown extending 45 degrees from this hinged edge, although another angular position for this panel also will become apparent from the description provided later herein. The display rerouting apparatus 5 also includes an arch-shaped elongated extension or shroud 40 which sits atop of an apex formed by the convergence of the rear panel 20 and the front panel 30. As illustrated in FIG. 2, this shroud 40 is shown displaced and extending above the apex formed by the convergence of the rear panel 20 and the front panel 30. The shroud 40 optionally contains a light source 45 for enhanced visibility, although suitable operation of the invention is possible without such light source. A switch 48 is optionally included on the light source 45 for selectively activating and deactivating this light source.

As illustrated in FIGS. 2 through 4b, the lower edge of the rear panel 20 and the lower edge of the front panel 30 are adjustably attached by hinges 17 and 19 to the base panel 10 for enabling the display rerouting device to be flexibly positioned on a display module. Such positioning flexibility enables the display rerouting apparatus to accommodate a number of display module positions in communication equipment. A first edge of the shroud 40 is attached to the uppermost edge of the rear panel 20. A second edge of this shroud 40 has a first catch member 37 molded therein for engaging one of a plurality of second catch members 38 and 39 which are molded into the uppermost edge of the front panel 30. A rear panel extension member 33, along with the shroud 40, is attached to the uppermost edge of the rear panel 20 and extends inwardly towards the front panel 30 for providing a shoulder for attaching the light source 40 to the apparatus.

In the embodiment shown in FIGS. 1 through 4b, the base panel 10 may be constructed from Acrylonitrile-Butadiene-Styrene (ABS) material and a suitable window cut in this material. Or the base panel 10 may also be constructed from a transparent material or glass; thus, eliminating the need for a window 12. The base panel 10 may be secured to a display module by fastening means generally available in the art. For example, commercially available adhesives or even Velcro fasteners may be readily employed for this purpose. The front panel 30 and rear panel 20 may be constructed from any material strong enough to respectively support the two-way reflective mirror 35 and one-way reflective mirror 25, such as ABS material. Also, the shroud 40 may be constructed from ABS material, as well. One and two-way reflective mirrors are available in the art from a number of suppliers and may be constructed from known materials. The one-way reflective mirror 25, for example, may be constructed on glass by applying a coating of a reflective material, such as pyrolytic coating of ECLIPSE® Reflective glass—available from Libbey-Owens-Ford, a division of Pilkington, of London, England. The two-way reflective mirror 35 may be constructed on glass by applying a coating of a reflective material, such as ATS-125 Mirropane EP®—also available from Libbey-Owens-Ford of London, England.

Figure 4A:
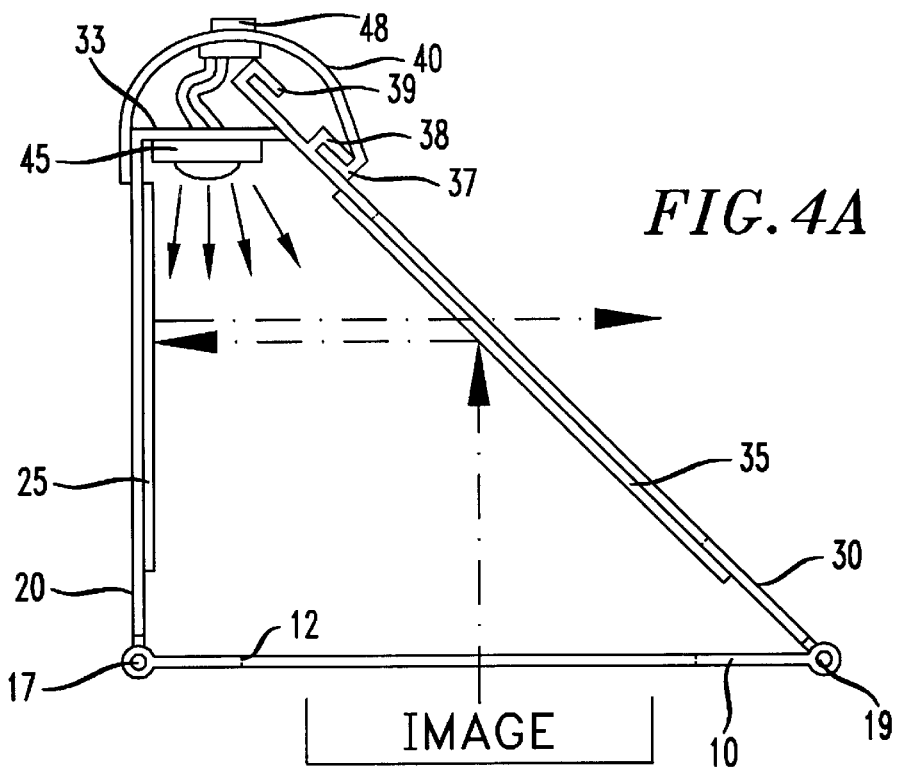
FIG. 4a illustrates a side elevation view of the display rerouting apparatus depicted in FIG. 1, configured for positioning on a display module extending substantially in a horizontal plane in accordance with the present invention.

In operation of the display rerouting apparatus 5 with particular reference next to FIG. 4a, the image contained in the display module 15 is projected upwardly through the opening 12 and onto the two-way reflective mirror 35. From the two-way reflective mirror 35, the image is projected onto the one-way reflective mirror 25. The image impacting the one-way reflective mirror 25 is next reflected back to and through the two-way reflective mirror 35. The reflected image from the one-way reflective mirror 25 can thus be viewed by a user looking through the two-way reflective mirror 35. Since images in plane mirrors differ from objects by virtue of reversal of left-right symmetry, the reflected image of the two-way reflective mirror 35 onto the one-way reflective mirror 25 is the reversal of the displayed image. This second reflection from the one-way reflective mirror 25 of the displayed image corrects the reversal of left-right symmetry; therefore, the viewer sees the original displayed image.

Figure 4B:
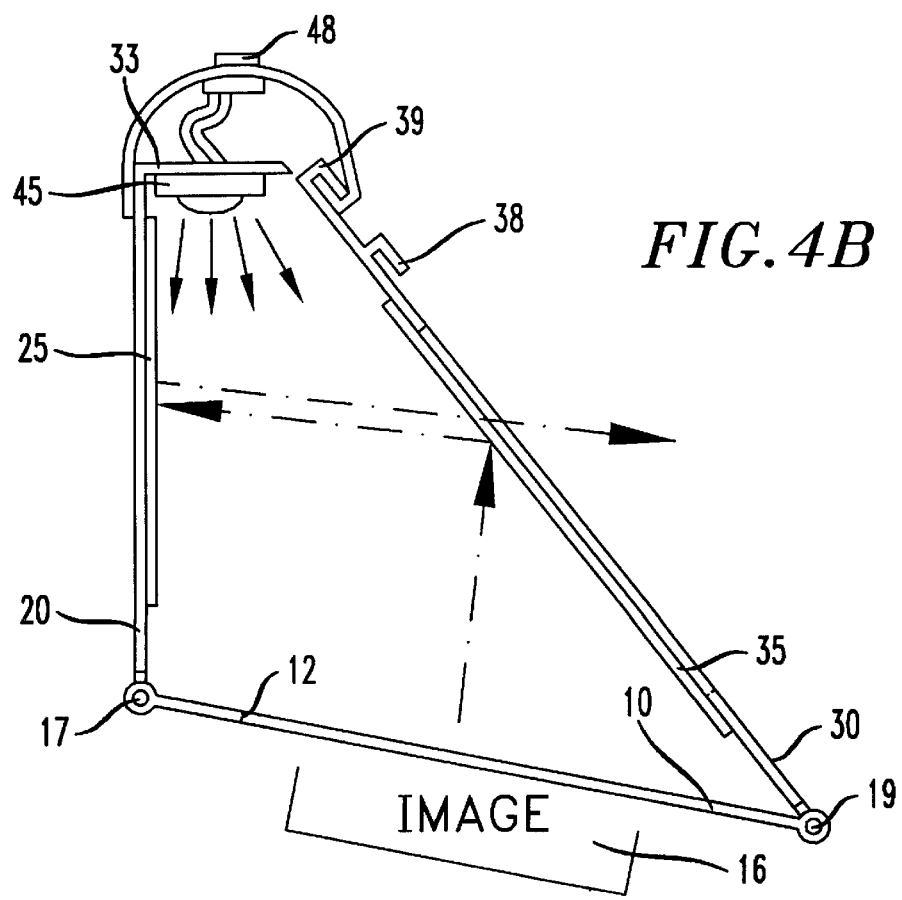
FIG. 4b illustrates a side elevation view of the display rerouting apparatus depicted in FIG. 1, modified for positioning on a tilted display module, in accordance with the present invention.

FIG. 4b illustrates a side elevation view of the display rerouting apparatus as depicted in FIG. 1, configured for positioning on a tilted display module. Functionally, the display rerouting apparatus is flexible enough to be configured over a display module which does not extend in a horizontal plane. As illustrated in FIG. 4a, a first configured position is available such that the upper edge of the front panel 30, which illustratively contains two catch members 38 and 39, has catch member 38 engaged with catch member 37 on the shroud 40. As further illustrated in FIG. 4a for this embodiment, the display rerouting apparatus 5 is configured for positioning over a display module 15 which extends generally in a horizontal plane. Alternatively, and as illustrated in FIG. 4b, in accordance with the disclosed embodiment, a second configured position may be selected for positioning the display rerouting apparatus 5 on a tilted display module 16. In this second configured position, the catch member 37 is removed from engagement with the catch member 38 and engaged with the catch member 39. Switching between the two positions for the display rerouting apparatus is achieved by simply pressing the top of the shroud 40 in a downward direction. Such action releases the catch member 37 from engagement with either the catch member 38 or 39 enabling the front panel 30 of the display rerouting apparatus to be set into a different position. Although only two catch members are shown on the front panel 30, it is to be understood that a greater number may be employed, thereby enabling the display rerouting apparatus 5 to accommodate a greater number of tilted display modules.

Figure 5A:
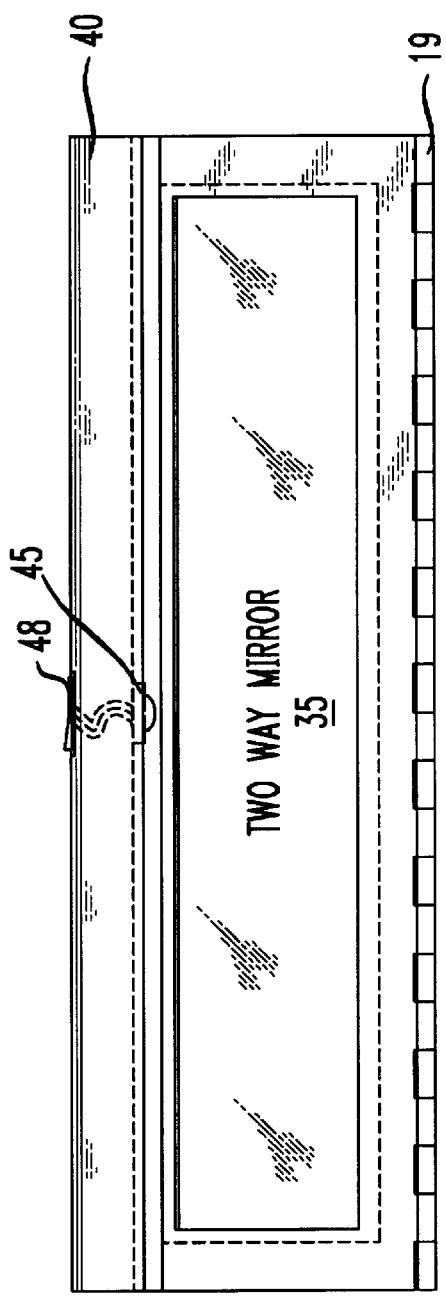
FIG. 5a illustrates the front planar view of the embodiment depicted in FIG. 1, in accordance with the present invention.
Figure 5B:
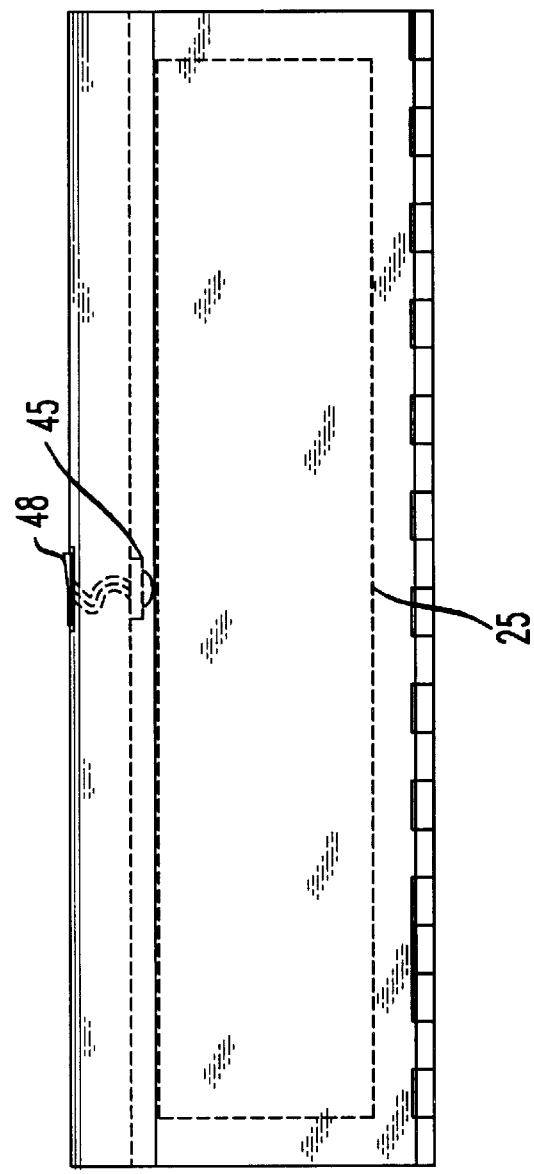
FIG. 5b illustrates the rear planar view of the embodiment depicted in FIG. 1, in accordance with the present invention.

FIG. 5a shows the front-planar view of the embodiment depicted in FIG. 1 for the display rerouting apparatus 5. As illustrated, the two-way reflective mirror 35 is recessed in the front panel 30. FIG. 5b shows the rear planar view of the embodiment depicted in FIG. 1 for the display rerouting apparatus 5. As illustrated, the one-way reflective mirror 25 is recessed in the rear panel 20.

Figure 6:
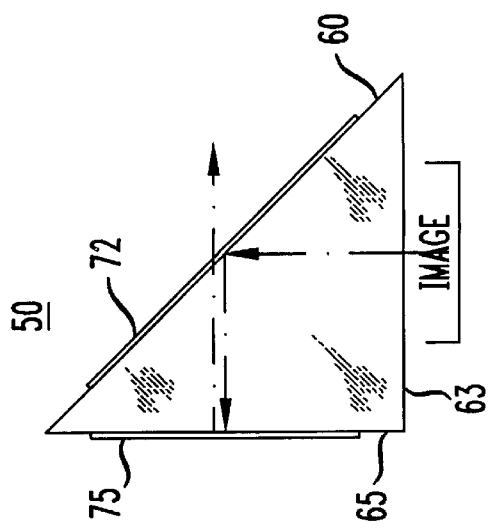
FIG. 6 illustrates a side elevation view of a second embodiment of the display rerouting apparatus, in accordance with the present invention.

Referring next to FIG. 6, there is shown an illustration of a side elevation view of a second embodiment of a display rerouting apparatus 50. The display rerouting apparatus 50 is a prism with a first side 60 and a second side 65, and a base 63. The first side 60 is coated with a two-way reflective coating for forming a two-way reflective mirror 72. The second side 65 is coated with a one-way reflective coating for forming a one-way reflective mirror 75. In this embodiment, the prism is made of a transparent material, such as glass. The one-way reflective coating is a reflective material, such as pyrolytic coating of ECLIPSE® Reflective glass—available from Libbey-Owens-Ford, a division of Pilkington, of London, England. The two-way reflective coating is a reflective coating which is not completely opaque on glass, such as ATS-125 Mirropane EP®—also available from Libbey-Owens-Ford of London, England.

Figure 7A:
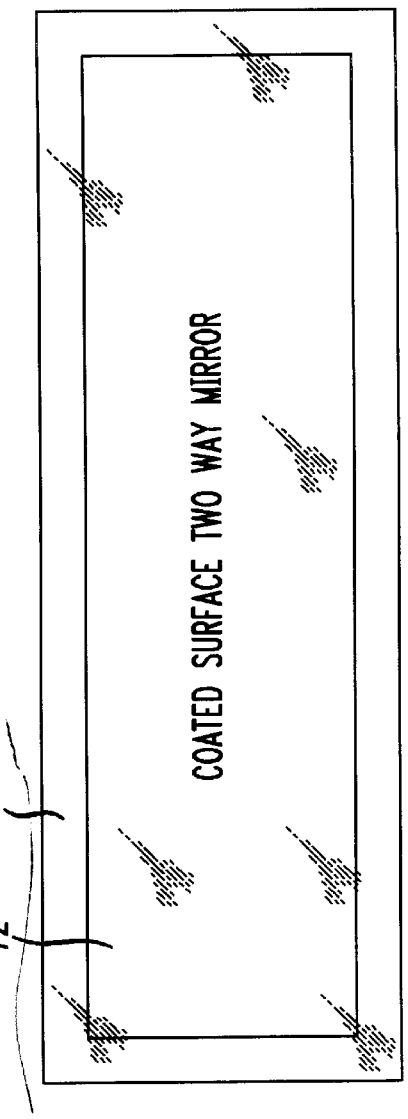
FIG. 7a illustrates the front planar view of the embodiment depicted in FIG. 6, in accordance with the present invention.
Figure 7B:
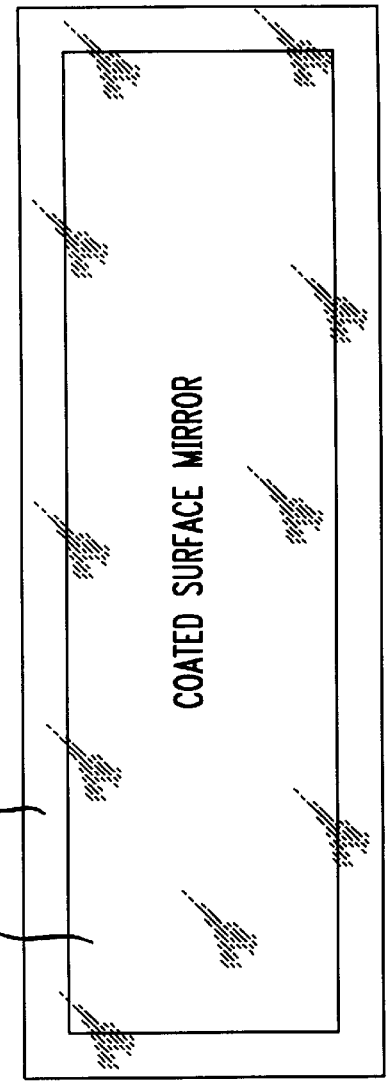
FIG. 7b illustrates the rear planar view of the embodiment depicted in FIG. 6, in accordance with the present invention.

FIG. 7a depicts a front-view of the embodiment of the present invention showing the display rerouting apparatus 50. As illustrated, the two-way reflective coating is applied to the front panel 60. Also, in FIG. 7b, the rear view of the embodiment, depicts a one-way reflective coating which has been applied to the rear panel 65. Functionally, when the base 63 of the prism is placed upon a display module of some type of communication equipment, the displayed image projects through the base 63, is reflected off of the two-way reflective mirror 72 and projected onto the one-way reflective mirror 75. The reflected image on the one-way reflective mirror 75 can be viewed by a user while looking through the two-way reflective mirror 72.

Various other embodiments and modifications of this invention are contemplated and may obviously be resorted to by those skilled in the art without departing from the spirit and scope of the invention as hereinafter defined by the appended claims.

I claim:

1. An apparatus for receiving a displayed image from an image source and redirecting said image to increase visibility of a display comprising, a base for placement upon the displayed image from said image source, a plurality of sides, a plurality of fastening means for adjustably mounting said sides to said base, a two-way reflective mirror for reflecting said displayed image received from said image source wherein said two-way reflective mirror is positioned in said side adjacent to said base at a predetermined angle, a one-way reflective mirror for reflecting the reflected image of said two-way reflective mirror, wherein said one-way reflective mirror is positioned in said side opposite said two-way reflective mirror, and a shroud attached to said side having said one-way reflective mirror positioned therein.

2. The apparatus of claim 1, further comprising
   a light source attached to at least one of said plurality of sides for enhancing said reflected image.

3. An apparatus for rerouting a displayed image from an image source for providing a redirected angular visibility for the displayed image, said apparatus comprising:

a base for placement upon the image source, said displayed image projecting through said base;

a two-way reflective mirror for projecting and reflecting images, said two-way mirror reflecting said displayed image projecting through said base to said two-way reflective mirror, and said two-way reflective mirror being positioned at a predetermined angle to said base;

a one-way reflective mirror for reflecting said displayed image reflected from said two-way reflective mirror onto said one-way reflective mirror, said one-way reflective mirror being positioned for reflecting said displayed image back to said two-way reflective mirror, wherein said two-way reflective mirror projects said displayed image received from said one-way reflective mirror for viewing external to said apparatus at a second angle different from a first angle for viewing of said image source; and wherein both said two-way mirror and said one-way mirrors are hingeably attached to said base, said two way mirror having a first edge hingeably attached to a first edge of said base and said one-way mirror having a first edge hingeably attached to a second edge of said base.

4. The apparatus of claim 3 further comprising a shroud attached to a second edge of said one-way reflective mirror, said second edge being oppositely disposed to said first edge of said one-way reflective mirror.

5. The apparatus of claim 4 further comprising a light source attached to said shroud for enhancing visibility for the reflected image.

6. The apparatus of claim 4 wherein said shroud includes a first catch member for engaging one of a plurality of catch members disposed on said two-way reflective mirror for securing said two-way mirror to said shroud.

* * * * *